(12) United States Patent
Han et al.

(10) Patent No.: US 12,322,805 B2
(45) Date of Patent: Jun. 3, 2025

(54) ELECTRODE BINDER COMPOSITION FOR RECHARGEABLE BATTERY AND ELECTRODE MIXTURE INCLUDING THE SAME

(71) Applicant: LG Chem, Ltd., Seoul (KR)

(72) Inventors: Seon Hee Han, Daejeon (KR); Jung Sup Han, Daejeon (KR); Min Ah Kang, Daejeon (KR); Wooseok Choi, Daejeon (KR); Dong Jo Ryu, Daejeon (KR); Se Eun Lee, Daejeon (KR); Jeong Man Son, Daejeon (KR); Byoung Yun Kim, Daejeon (KR); Cheolhoon Choi, Daejeon (KR); Sungjin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 881 days.

(21) Appl. No.: 17/609,242

(22) PCT Filed: May 28, 2020

(86) PCT No.: PCT/KR2020/006877
§ 371 (c)(1),
(2) Date: Nov. 5, 2021

(87) PCT Pub. No.: WO2020/242205
PCT Pub. Date: Dec. 3, 2020

(65) Prior Publication Data
US 2022/0209238 A1 Jun. 30, 2022

(30) Foreign Application Priority Data

May 28, 2019 (KR) .................. 10-2019-0062679
May 26, 2020 (KR) .................. 10-2020-0063199

(51) Int. Cl.
*H01M 4/62* (2006.01)
*C08L 9/10* (2006.01)
*H01M 4/587* (2010.01)
*H01M 10/0525* (2010.01)

(52) U.S. Cl.
CPC .............. *H01M 4/622* (2013.01); *C08L 9/10* (2013.01); *H01M 4/587* (2013.01); *H01M 4/625* (2013.01); *H01M 10/0525* (2013.01); *C08L 2203/20* (2013.01); *C08L 2205/025* (2013.01)

(58) Field of Classification Search
CPC .................................................. H01M 4/622
See application file for complete search history.

(56) References Cited

U.S. PATENT DOCUMENTS 9,284,688 B2 * 3/2016 Kobayashi ............. D21H 19/48
2002/0173560 A1 11/2002 Thielen 2007/0088132 A1 4/2007 Taniguchi et al.
2014/0038047 A1 2/2014 Chung et al.
2014/0239239 A1 * 8/2014 Cha ........................ H01M 4/134
525/218
2015/0125746 A1 5/2015 Sonobe et al.
2016/0036055 A1 2/2016 Yamamoto
2016/0233512 A1 8/2016 Park et al.
2019/0044148 A1 2/2019 Yamamoto
2019/0148732 A1 5/2019 Takahashi et al.
2019/0375922 A1 12/2019 Lee et al.
2020/0411872 A1 12/2020 Han et al.

FOREIGN PATENT DOCUMENTS

| CN | 104321913 A | 1/2015 | |
|----|----|----|----|
| CN | 105190967 A | 12/2015 | |
| CN | 107338011 A * | 11/2017 | ............ C08F 212/08 |
| CN | 107868160 A * | 4/2018 | ................ C08F 2/26 |
| CN | 109314244 A | 2/2019 | |
| JP | H08250123 A | 9/1996 | |
| JP | H09208633 A | 8/1997 | |
| JP | H09320604 A | 12/1997 | |
| JP | 2002293994 A | 10/2002 | |
| JP | 2011108373 A | 6/2011 | |
| JP | 2013171806 A | 9/2013 | |
| JP | 2013229327 A | 11/2013 | |
| JP | 2014123550 A | 7/2014 | |
| JP | 2016162671 A | 9/2016 | |
| JP | 6327178 B2 | 5/2018 | |
| JP | 6363331 B2 | 7/2018 | |
| KR | 20060126908 A | 12/2006 | |
| KR | 101155395 B1 | 6/2012 | |
| KR | 20150035543 A | 4/2015 | |
| KR | 101615940 B1 | 4/2016 | |
| KR | 20160064025 A | 6/2016 | |
| KR | 20180111829 A | 10/2018 | |
| KR | 20190073693 A | 6/2019 | |
| KR | 20200052778 A | 5/2020 | |
| WO | 2018003707 A1 | 1/2018 | |
| WO | 2020096287 A1 | 5/2020 | |

OTHER PUBLICATIONS

Extended European Search Report for Application No. 20814798.3 dated Jun. 30, 2022. 8 pgs.
International Search Report for PCTKR2020006877 dated Aug. 24, 2020, 2 pgs.

* cited by examiner

Primary Examiner — Amanda C. Walke
(74) Attorney, Agent, or Firm — Lerner David LLP

(57) ABSTRACT

The present disclosure relates to an electrode binder composition for a rechargeable battery and an electrode mixture comprising the same. The electrode binder composition for a rechargeable battery of the present disclosure not only has excellent properties in terms of binding strength, mechanical properties, and the like, but also can maintain structural stability of an electrode even after repeated charge/discharge cycles, thus improving rechargeable battery performances.

14 Claims, No Drawings

ELECTRODE BINDER COMPOSITION FOR RECHARGEABLE BATTERY AND ELECTRODE MIXTURE INCLUDING THE SAME

CROSS-REFERENCE TO RELATED APPLICATIONS

The present application is a national phase entry under 35 U.S.C. § 371 of International Application No. PCT/KR2020/006877, filed on May 28, 2020, which claims priority to Korean Patent Application No. 10-2019-0062679, filed on May 28, 2019, and Korean Patent Application No. 10-2020-0063199, filed on May 26, 2020, the disclosures of which are herein incorporated by reference in their entirety.

BACKGROUND OF THE INVENTION

(a) Field of the Invention

The present disclosure relates to an electrode binder composition for a rechargeable battery and an electrode mixture including the same.

(b) Description of the Related Art

Due to rapid increase in the use of fossil fuel, there is an increasing demand for the use of alternative energy or clean energy, and as part of that, the field of rechargeable batteries using electrochemistry is being most actively studied.

Recently, with the increase in technical development and demand for portable devices such as a portable computer, a portable telephone, a camera, and the like, a demand for rechargeable batteries is rapidly increasing as the energy source, and among the rechargeable batteries, lithium rechargeable batteries having high energy density and operating potential, long cycle life and low self-discharge rate have been studied a lot and commercialized and are being widely used.

And, with the increase in the interest in environmental problems, a lot of studies on electric vehicles or hybrid vehicles capable of replacing fossil fuel engine, one of the main causes of air pollution, are being progressed, and lithium rechargeable batteries are also used as a power source of such electric vehicles, hybrid vehicles, and the like.

In general, in lithium rechargeable batteries, lithium transition metal oxide is used as cathode active material, and graphite material is used as anode active material. The electrode of a lithium rechargeable battery is prepared by mixing such active materials with binder components, dispersing it in a solvent to form slurry, and then, coating it on the surface of a current collector to form a mixture layer.

In general, charge and discharge of a lithium rechargeable battery is progressed while repeating intercalation/deintercalation of lithium ions of the cathode into/from the anode, and during the repeated process, binding between electrode active materials or conductive materials becomes loose, and contact resistance between particles increases, and thus, resistance of the electrode itself may also increase.

Thus, binder used in an electrode should not only maintain excellent binding strength between electrode active material and a current collector, but also be able to compensate for expansion/contraction of electrode active material according to intercalation/deintercalation of lithium ions in the electrode.

Particularly, recently, in order to increase discharge capacity of an electrode, material having high discharge capacity such as silicon, tin, silicon-tin alloy, and the like is frequently mixed with natural graphite having theoretical discharge capacity of 372 mAh/g, and thus, with repeated charge and discharge, volume expansion rate of material remarkably increases, and anode material is detached, and thus, battery capacity rapidly decreases, and cycle life becomes short.

And, a lithium ions battery may be swollen by gas generated during the decomposition of electrolyte inside of the battery, and if the temperature of a battery increases with the use of electronic products, the decomposition of electrolyte may be promoted, swelling may be accelerated, and the stability of a battery may be deteriorated.

Thus, there is an urgent demand for studies on binder and electrode materials that can not only realize excellent binding strength, but also maintain structural stability of an electrode even after repeated charge/discharge cycles.

SUMMARY OF THE INVENTION

Technical Problem

It is an object of the invention to provide an electrode binder composition for a rechargeable battery that not only has excellent properties in terms of binding strength, mechanical properties, and the like, but also can maintain structural stability of an electrode even after repeated charge/discharge cycles.

It is another object of the invention to provide a rechargeable battery electrode mixture comprising the electrode binder composition for a rechargeable battery.

It is still another object of the invention to provide a rechargeable battery electrode comprising the rechargeable battery electrode mixture.

It is still another object of the invention to provide a rechargeable battery comprising the rechargeable battery electrode.

Technical Solution

According to one aspect of the present disclosure, there is provided an electrode binder composition for a rechargeable battery comprising (A) one or more latex particles among aliphatic conjugated diene based latex particles (A1) having a gel content calculated by the following Mathematical Formula 1 of 90 wt % or more, and acrylic acid ester based latex particles (A2); and (B) styrene-butadiene based elastomer rubber (SBR) having a gel content calculated by the following Mathematical Formula 2 of less than 20 wt %:

$$\text{Gel content (wt \%)} = 100 * Mb1/Ma1 \quad \text{[Mathematical Formula 1]}$$

in the Mathematical Formula 1, Ma1 is the weight of aliphatic conjugated diene based latex particles (A1), measured after drying at 80° C. for 24 hours; Mb1 is the weight measured after immersing the aliphatic conjugated diene based latex particles (A1) of which weight has been measured, in tetrahydrofurane (THF) at room temperature for 24 hours, and sieving with a 200 mesh sieve, and then, drying at 80° C. for 24 hours, $$\text{Gel content (wt \%)} = 100 * Mb2/Ma2 \quad \text{[Mathematical Formula 2]}$$

in the Mathematical Formula 2 Ma2 is the weight of styrene-butadiene based elastomer rubber (SBR) (B), after drying at 80° C. for 24 hours; and Mb2 is the weight measured after immersing the styrene-butadiene based elastomer rubber (SBR) (B) of which weight has been measured, in tetrahydrofurane (THF) at room temperature for 24 hours, and sieving with a 200 mesh sieve, and then, drying at 80° C. for 24 hours.

The aliphatic conjugated diene based latex particles (A1) may comprise repeat units derived from aliphatic conjugated diene based monomers; and repeat units derived from one or more monomers selected from the group consisting of aromatic vinyl based monomers, alkyl (meth)acrylic acid ester based monomers, (meth)acryl amide based monomer, alkenyl cyanide monomers, and unsaturated carboxylic acid based monomers.

Wherein, the aliphatic conjugated diene based latex particles (A1) may comprise 30 to 60 wt % of repeat units derived from aliphatic conjugated diene based monomers; 35 to 60 wt % of repeat units derived from aromatic vinyl based monomers; 1 to 10 wt % of repeat units derived from alkyl (meth)acrylic acid ester based monomers; and 1 to 10 wt % of repeat units derived from unsaturated carboxylic acid based monomers.

The acrylic acid ester based latex particles (A2) may comprise; repeat units derived from alkyl (meth)acrylic acid ester based monomers; and repeat units derived from one or more monomers selected from the group consisting of aromatic vinyl based monomers, (meth)acryl amide based monomers, alkenyl cyanide monomers, and repeat units derived from unsaturated carboxylic acid based monomers.

Wherein, the acrylic acid ester based latex particles (A2) may comprise; 50 to 95 wt % of repeat units derived from alkyl (meth)acrylic acid ester based monomers; 1 to 40 wt % of repeat units derived from one or more monomers selected from the group consisting of aromatic vinyl based monomers, (meth)acryl amide based monomers, and alkenyl cyanide monomers; and 1 to 20 wt % of repeat units derived from unsaturated carboxylic acid based monomers.

And, the styrene-butadiene based elastomer rubber (SBR) (B) may comprise repeat units derived from styrene based monomers, repeat units derived from conjugated diene based monomers, repeat units derived from hydroxyalkyl (meth)acrylate monomers, and repeat units derived from unsaturated carboxylic acid based monomers.

Wherein, the styrene-butadiene based elastomer rubber (SBR) (B) may comprise; 30 to 60 wt % of repeat units derived from styrene based monomers; 35 to 65 wt % of repeat units derived from conjugated diene based monomers; 1 to 10 wt % of repeat units derived from hydroxyalkyl (meth)acrylate monomers; and 1 to 10 wt % of repeat units derived from unsaturated carboxylic acid based monomers.

And, the styrene-butadiene based elastomer rubber (SBR) (B) may have Moony viscosity (MV) at 100° C. of about 30 to about 170.

And, the styrene-butadiene based elastomer rubber (SBR) (B) may have glass transition temperature measured by differential scanning calorimetry, of about −5 to about −40° C.

According to one embodiment, the binder composition for a rechargeable battery may comprise, based on 100 parts by weight of the latex particles (A), 1 to 40 parts by weight of styrene-butadiene based elastomer rubber (SBR) (B), and preferably, the lower limit may be about 1 part by weight or more, or about 5 parts by weight or more, and the upper limit may be about 40 parts by weight or less, or about 30 parts by weight or less.

Meanwhile, according to another aspect of the present disclosure, there is provided a rechargeable battery electrode mixture comprising the above explained binder composition for a rechargeable battery, and electrode active material.

Wherein, the rechargeable battery electrode mixture may further comprise a conductive agent.

Meanwhile, according to yet another aspect of the present disclosure, there is provided a rechargeable battery electrode comprising; an electrode mixture layer comprising the above explained rechargeable battery electrode mixture; and an electrode current collector.

Meanwhile, according to yet another aspect of the present disclosure, there is provided a rechargeable battery comprising the above explained rechargeable battery electrode.

As used herein, terms "a first", "a second" and the like are used to explain various constructional elements, and they are used only to distinguish one constructional element from other constructional elements.

And, the terms used herein are only to explain specific embodiments, and are not intended to limit the present invention.

A singular expression includes a plural expression thereof, unless it is expressly stated or obvious from the context that such is not intended.

As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each layer or element is formed "on" or "above" each layer or element, it means that each layer or element is formed directly on each layer or element, or that other layers or elements may be additionally formed between the layers, or on the object or substrate.

Although various modifications can be made to the present invention and the present invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, the present disclosure will be explained in detail.

According to one aspect of the present disclosure, there is provided an electrode binder composition for a rechargeable battery comprising; (A) one or more latex particles among (A1) aliphatic conjugated diene based latex particles (A1) having a gel content calculated by the following Mathematical Formula 1 of 90 wt % or more, and acrylic ester based latex particles (A2); and (B) styrene-butadiene based elastomer rubber (SBR) having a gel content calculated by the following Mathematical Formula 2 of less than 20 wt %.

Wherein, the gel content of the aliphatic conjugated diene based latex particles may be preferably 90 wt % or more, or about 95 wt % or more, or about 97 wt % or more, and about 100 wt % or less, or about 99 wt % or less.

And, the gel content of the styrene-butadiene based elastic elastomer rubber may be less than about 20 wt %, and preferably, it is greater than about 0 wt %, or about 0.5 wt % or more, or about 3 wt % or more, or about 5 wt % or more, and less than about 20 wt %, or about 15 wt % or less, or about 13 wt % or less.

Wherein, gels existing in a certain amount in the aliphatic conjugated diene based latex particles and the styrene-butadiene based elastomer rubber are formed by gelation by the crosslinking reaction between polymer particles, and the gel content generally indicates the crosslinking degree of latex particles or elastomer rubber.

The inventors of the present disclosure discovered that in case styrene-butadiene based elastomer is additionally used in the existing binder composition for a rechargeable battery comprising the emulsion of latex particles prepared by emulsion polymerization of conjugated diene based monomers and/or acrylate based monomers, and the like, adhesion may be significantly improved, and thus, delamination between electrode active materials or between electrode active material and a current collector may be prevented, and stable binding may be realized, and completed the invention.

A binder composition for a rechargeable battery according to one embodiment comprises emulsion polymer particles, namely latex particles of specific monomers, and each monomers may exist in the form of repeat units derived from the monomers in the latex particles.

Aliphatic Conjugated Diene Based Latex Particles (A1)

A binder composition for a rechargeable battery according to one embodiment comprises aliphatic conjugated diene based latex particles (A1) having a gel content of 90 wt % or more.

Monomers

First, for the emulsion polymerization for preparing the aliphatic conjugated diene based latex particles (A1), conjugated diene monomers are used, and thus, the latex particles comprise repeat units derived from conjugated diene based monomers.

As representative examples of the conjugated diene based monomers, one or more selected from the group consisting of 1,3-butadiene, isoprene, chloroprene, and piperylene may be mentioned, and preferably, it may be 1,3-butadiene.

In case such conjugated diene based monomers are included as the components of aliphatic conjugated diene based latex particles, a binder prepared therefrom may inhibit electrolyte swelling at high temperature, decrease gas generation, and improve adhesive strength so as to maintain binding strength between electrode active material and a current collector.

And, for the emulsion polymerization for preparing the latex particles, besides the conjugated based diene monomers, one or more monomers selected from the group consisting of aromatic vinyl based monomers, alkyl (meth)acrylic acid ester based monomers, (meth)acryl amide based monomers, alkenyl cyanide monomers, and unsaturated carboxylic acid based monomers may be additionally used, and thus, the aliphatic conjugated diene based latex particles (A1) may comprise repeat units derived from these monomers.

The aromatic vinyl based monomers may be one or more selected from the group consisting of styrene, α-methylstyrene, β-methylstyrene, p-t-butylstyrene, chlorostyrene, vinylbenzoic acid, methyl vinylbenzoate, vinyl naphthalene, chloromethylstyrene, hydroxymethylstyrene and divinylbenzene, preferably, styrene.

And, the alkyl (meth)acrylic acid ester based monomers may be one or more selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, lauryl acrylate, cetyl acrylate, stearyl acrylate, lauryl methacrylate, cetyl methacrylate and stearyl methacrylate.

And, the (meth)acryl amide based monomers may be one or more selected from the group consisting of acrylamide, n-methylol acrylamide, n-butoxymethyl acrylamide, methacrylamide, n-methylol methacrylamide, n-butoxymethyl methacrylamide.

And, the alkenyl cyanide monomers are monomers including both ethylenically unsaturated groups and nitrile groups in the molecule, and for example, acrylonitrile, methacrylonitrile, allyl cyanide, and the like may be mentioned.

And, the unsaturated carboxylic acid based monomers may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

Wherein, the aliphatic conjugated diene based latex particles (A1) may comprise; 30 to 60 wt % of repeat units derived from aliphatic conjugated diene based monomers; 35 to 60 wt % of repeat units derived from aromatic vinyl based monomers; 1 to 10 wt % of repeat units derived from alkyl (meth)acrylic acid ester based monomers; and 1 to 10 wt % of repeat units derived from unsaturated carboxylic acid based monomers.

Preferably, the aliphatic conjugated diene based latex particles (A1) may comprise; about 35 to about 45 wt % of repeat units derived from aliphatic conjugated diene based monomers; about 45 to about 50 wt % of repeat units derived from aromatic vinyl based monomers; about 3 to about 8 wt % of repeat units derived from alkyl (meth)acrylic acid ester based monomers; and about 3 to about 8 wt % of repeat units derived from unsaturated carboxylic acid based monomers.

If the repeat units derived from aliphatic conjugated diene based monomers are excessively included, glass transition temperature of the binder may decrease, and thus, adhesion strength may be deteriorated, and if the repeat units derived from other monomers are excessively included, glass transition temperature of the binder may increase, and rigidity may increase, and thus, flexibility and adhesion may be deteriorated.

And, the aliphatic conjugated diene based latex particles (A1) may have a gel content of 90 to about 100 wt %. The lower limit may be 90 wt % or more, or about 95 wt % or more, or about 97 wt % or more, and the upper limit may be about 100 wt % or less, or less than about 100 wt %, or about 99 wt % or less.

If the gel content of the aliphatic conjugated diene based latex particles (A1) is within the above range, due to high gel content, electrolyte wetting after preparation of an electrode may decrease, and thus, durability of the binder may become excellent, and despite repeated charge/discharge, excellent battery performances can be maintained.

Emulsion Polymerization

The above explained aliphatic conjugated diene based latex particles (A1) may be prepared by a commonly known emulsion polymerization method.

Wherein, polymerization temperature and polymerization time may be appropriately determined according to circumstances. For example, the polymerization temperature may be about 50° C. to about 200° C., or about 50° C. to about 100° C. and polymerization time may be about 0.5 hours to about 20 hours, or about 1 to about 10 hours.

As polymerization initiators that can be used for the emulsion polymerization, inorganic or organic peroxide may be mentioned, and for example, water soluble initiators including potassium persulfate, sodium persulfate, ammonium persulfate, and the like, and oil soluble initiators including cumene hydroperoxide, benzoyl peroxide, and the like may be used.

And, an activator for promoting the initiation of the reaction of peroxide may be further included together with the polymerization initiator, and as the activators, one or more selected from the group consisting of sodium formaldehyde sulfoxylate, sodium ethylenediamine tetraacetate, ferrous sulfate and dextrose may be used.

However, in the preparation method of the present disclosure, preferably, a molecular weight control agent such as dodecyl mercaptane, mercaptanes, and the like is not used. In case a molecular weight control agent is not used, prepared aliphatic conjugated diene based latex particles may have relatively high gel content, and despite repeated charge/discharge, excellent battery performances may be maintained.

As the emulsifier used in the emulsion polymerization, one or more emulsifiers selected from the group consisting of anionic emulsifiers, cationic emulsifiers, and non-ionic emulsifiers may be mentioned.

The emulsifier is material simultaneously having a hydrophilic group and a hydrophobic group, and during the emulsion polymerization process, it forms a micelle structure and enables polymerization of monomers inside the micelle structure.

The emulsifiers commonly used for emulsion polymerization may be classified into anionic emulsifiers, cationic emulsifiers and non-ionic emulsifiers, and for polymerization stability in the emulsion polymerization, two or more kinds may be used in combination.

Specifically, as the anionic emulsifiers, sodium dodecy diphenyl ether disulfonate, sodium polyoxy ethylene alkyl ether sulfate, sodium lauryl sulfate, sodium dodecyl benzene sulfonate, dioctyl sodium sulfosuccinate, and the like may be mentioned.

And, the non-ionic emulsifiers may be polyethylene oxide alkyl aryl ether, polyethylene oxide alkyl amine, polyethylene oxide alkyl ester, and the like, they may be used alone or in combinations of two or more kinds, and using anionic emulsifier and non-ionic emulsifier in combination may be more effective, but the kind of emulsifiers is not limited thereto.

The emulsifier may be used in the amount of about 0.01 to about 10 parts by weight, about 1 to about 10 parts by weight, or about 3 to about 5 parts by weight, based on 100 parts by weight of the total monomer components used for the preparation of latex particles.

If the emulsifier is used in an excessive amount, the particle diameter of latex particles may decrease, and thus, the adhesive strength of binder may be lowered, and if it is used too small, polymerization stability in the emulsion polymerization reaction may be lowered, and the stability of produced latex particles may be also lowered.

Acrylic Acid Ester Based Latex Particles (A2)

And, the binder composition for a rechargeable battery according to one aspect of the present disclosure comprises acrylic acid ester based latex particles (A2).

Monomers

First, for the emulsion polymerization for preparing acrylic acid ester based latex particles (A2), acrylic acid ester based monomers are used, and thus, the latex particles comprise repeat units derived from acrylic acid ester based monomers.

The acrylic acid ester based latex particles (A2), due to relatively high swelling degree, may decrease electrode resistance, and increase ion conductivity.

The alkyl (meth)acrylic acid ester based monomers may be one or more selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, lauryl acrylate, cetyl acrylate, stearyl acrylate, lauryl methacrylate, cetyl methacrylate and stearyl methacrylate.

And, in the emulsion polymerization for preparing the acrylic acid ester based latex particles (A2), in addition to the alkyl (meth)acrylic acid ester based monomers, one or more monomers selected from the group consisting of aromatic vinyl based monomers, (meth)acryl amide based monomers, alkenyl cyanide monomers, and unsaturated carboxylic acid based monomers may be further used, and thus, the acrylic acid ester based latex particles (A2) may comprise repeat units derived from these monomers.

The aromatic vinyl monomers may be one or more selected from the group consisting of styrene, α-methylstyrene, β-methylstyrene, p-t-butylstyrene, chlorostyrene, vinylbenzoic acid, methyl vinylbenzoate, vinyl naphthalene, chloromethylstyrene, hydroxymethylstyrene and divinylbenzene, preferably, styrene.

And, the (meth)acryl amide based monomers may be one or more selected from the group consisting of acrylamide, n-methylol acrylamide, n-butoxymethyl acrylamide, methacrylamide, n-methylol methacrylamide, n-butoxymethyl methacrylamide.

And, the alkenyl cyanide monomers are monomers including both ethylenically unsaturated groups and nitrile groups in the molecule, and for example, acrylonitrile, methacrylonitrile, allyl cyanide, and the like may be mentioned.

And, the unsaturated carboxylic acid based monomers may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

Wherein, the acrylic acid ester based latex particles (A2) may comprise; 50 to 95 wt % of repeat units derived from alkyl (meth)acrylic acid ester based monomers; 1 to 40 wt % of repeat units derived from one or more monomers selected from the group consisting of aromatic vinyl based monomers, (meth)acryl amide based monomers, and alkenyl cyanide monomers; and 1 to 20 wt % of repeat units derived from unsaturated carboxylic acid based monomers.

In case the content of the repeat units derived from each monomers is outside the above range, electrode resistance of the prepared battery may increase, ion conductivity may decrease, and when the battery is left at high temperature, electrolyte swelling may be accelerated, and an electrolyte may be decomposed or side reactions may occur, and thus, the thickness of an electrode may increase, and finally, delamination of an electrode may be caused.

Emulsion Polymerization

The above explained acrylic acid ester based latex particles (A2) may be prepared by a commonly known emulsion polymerization method.

Wherein, polymerization temperature and polymerization time may be appropriately determined according to circumstances. For example, the polymerization temperature may be about 50° C. to about 200° C., or about 50° C. to about 100° C. and polymerization time may be about 0.5 hours to about 20 hours, or about 1 to about 10 hours.

As polymerization initiators that can be used for the emulsion polymerization, inorganic or organic peroxide may be mentioned, and for example, water soluble initiators including potassium persulfate, sodium persulfate, ammonium persulfate, and the like, and oil soluble initiators including cumene hydroperoxide, benzoyl peroxide, and the like may be used.

And, an activator for promoting the initiation of the reaction of peroxide may be further included together with the polymerization initiator, and as the activators, one or more selected from the group consisting of sodium formaldehyde sulfoxylate, sodium ethylenediamine tetraacetate, ferrous sulfate and dextrose may be used.

As the emulsifier used in the emulsion polymerization, one or more emulsifiers selected from the group consisting of anionic emulsifiers, cationic emulsifiers, and non-ionic emulsifiers may be mentioned.

The emulsifier is material simultaneously having a hydrophilic group and a hydrophobic group, and during the emulsion polymerization process, it forms a micelle structure and enables polymerization of monomers inside the micelle structure.

The emulsifiers commonly used for emulsion polymerization may be classified into anionic emulsifiers, cationic emulsifiers and non-ionic emulsifiers, and for polymerization stability in the emulsion polymerization, two or more kinds may be used in combination.

Specifically, as the anionic emulsifiers, sodium dodecy diphenyl ether disulfonate, sodium polyoxyethylene alkyl ether sulfate, sodium lauryl sulfate, sodium dodecyl benzene sulfonate, dioctyl sodium sulfosuccinate, and the like may be mentioned.

And, the non-ionic emulsifiers may be polyethylene oxide alkyl aryl ether, polyethylene oxide alkyl amine, polyethylene oxide alkyl ester, and the like, they may be used alone or in combinations of two or more kinds, and using anionic emulsifier and non-ionic emulsifier in combination may be more effective, but the kind of emulsifiers is not limited thereto.

The emulsifier may be used in the amount of about 0.01 to about 10 parts by weight, about 1 to about 10 parts by weight, or about 3 to about 5 parts by weight, based on 100 parts by weight of the total monomer components used for the preparation of latex particles.

If the emulsifier is used in an excessive amount, the particle diameter of latex particles may decrease, and thus, the adhesive strength of binder may be lowered, and if it is used too small, polymerization stability in the emulsion polymerization reaction may be lowered, and the stability of produced latex particles may be also lowered.

Styrene-Butadiene Based Elastomer Rubber (SBR) (B)

And, the binder composition for a rechargeable battery according to one aspect of the present disclosure comprises styrene-butadiene based elastomer rubber (SBR) (B) having a gel content less than 20 wt %.

The styrene-butadiene based elastomer rubber is a copolymer elastomer comprising styrene and butadiene, and when used in a binder for an electrode, it can invest elasticity to an electrode mixture due to the rubber component, and reduce the thickness of an electrode, and when cutting the coated electrode, electrode defects due to delamination may be remarkably decreased.

And, the styrene-butadiene based elastomer rubber (SBR) (B) may be a conjugated diene based copolymer rubber comprising: repeat units derived from styrene based monomers, repeat units derived from conjugated diene based monomers, repeat units derived from hydroxyalkyl (meth) acrylate monomers, and repeat units derived from unsaturated carboxylic acid based monomers.

As the styrene monomers, styrene, α-methylstyrene, β-methylstyrene, and p-t-butylstyrene, and the like may be mentioned.

As the conjugated diene based monomers, 1, 3-butadiene and isoprene may be mentioned.

And, as the hydroxyalkyl (meth)acrylate monomers, hydroxyethyl (meth)acrylate, hydroxypropyl (meth)acrylate, and hydroxybutyl (meth)acrylate, and the like may be mentioned.

And, the unsaturated carboxylic acid based monomers may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

Wherein, the styrene-butadiene based elastomer rubber (SBR) (B) may be a conjugated diene based copolymer rubber comprising: about 30 to about 60 wt % of repeat units derived from styrene based monomers; about 35 to about 65 wt % of repeat units derived from conjugated diene based monomers; about 1 to about 10 wt % of repeat units derived from hydroxyalkyl (meth)acrylate monomers; and about 1 to about 10 wt % of repeat units derived from unsaturated carboxylic acid based monomers.

Preferably, the styrene-butadiene based elastomer rubber (SBR) (B) may be a conjugated diene based copolymer rubber comprising: about 40 to about 50 wt % of repeat units derived from styrene based monomers; about 45 to about 59 wt % of repeat units derived from conjugated diene based monomers; about 1 to about 5 wt % of repeat units derived from hydroxyalkyl (meth)acrylate monomers; and about 1 to about 5 wt % of repeat units derived from unsaturated carboxylic acid based monomers.

The styrene-butadiene based elastomer rubber (SBR) (B) may have a Mooney viscosity (MV) at 100° C. of about 30 to about 170, and preferably, about 30 or more, or about 50 or more, or about 70 or more, and about 170 or less, or about 160 or less, or about 150 or less.

The Mooney viscosity may be significantly influenced by polymerization degree and gel content, when preparing styrene-butadiene based elastomer rubber, as well as the monomers included in the above explained styrene-butadiene based elastomer rubber.

As the Mooney viscosity of the styrene-butadiene based elastomer rubber falls within the above range, the styrene-butadiene based elastomer rubber may have excellent elasticity and viscosity, and when added to a binder for an electrode, it can improve battery performances.

And, the styrene-butadiene based elastomer rubber (SBR) (B) may have glass transition temperature measured by differential scanning calorimetry, of about −5 to about −40° C., preferably about −40° C. or more, or about −35° C. or more, or about −30° C. or more, and about −5° C. or less, or about −10° C. or less, or −20° C. or less.

If the glass transition temperature of the styrene-butadiene based elastomer rubber falls within the above range, the styrene-butadiene based elastomer rubber may have excellent elasticity and viscosity, and when added to a binder for an electrode, it can improve battery performances.

And, the styrene-butadiene based elastomer rubber (SBR) (B) may have a gel content greater than about 0 wt % and less than about 20 wt %, and preferably, greater than 0 wt %, or about 0.5 wt % or more, or about 3 wt % or more, or about 5 wt % or more, and less than about 20 wt %, or about 15 wt % or less, or about 13 wt % or less.

And, the styrene-butadiene based elastomer rubber (SBR) (B) may have weight average molecular weight of about 10,000 to about 900,000 g/mol, preferably, about 10,000 g/mol or more, or about 50,000 g/mol or more, or about 100,000 g/mol or more, or about 500,000 g/mol or more, and about 900,000 g/mol or less, or about 800,000 g/mol or less, or about 750,000 g/mol or less.

If the gel content and molecular weight of the styrene-butadiene based elastomer rubber (B) fall within the above ranges, adhesion may be increased, and flexibility may be increased, and thus, when preparing a battery electrode, delamination of cut side may be improved.

Particularly, if the gel content of the styrene-butadiene based elastomer rubber (B) is too high, microgel may be formed in a large quantity, and thus, when preparing an anode slurry, viscosity may become too high, or a filter may be blocked, thus limiting the use for electrode preparation.

Emulsion Polymerization

The above explained styrene-butadiene based elastomer rubber (B) may be prepared by an emulsion polymerization method different from those explained in latex particles (A1) and (A2) parts.

Namely, when preparing common latex particles, polymerization temperature and polymerization time may be appropriately determined according to circumstances, and for example, the polymerization temperature may be about 50° C. to about 200° C., or about 50° C. to about 100° C. and polymerization time may be about 0.5 hours to about 20 hours, or about 1 to about 10 hours.

However, the styrene-butadiene based elastomer rubber (B) of the present disclosure may be prepared by low temperature emulsion polymerization that is progressed at a low temperature of about 0 to about 30° C., or about 1 to about 25° C., or about 5 to 20° C., for about 0.5 hours to about 20 hours, or about 3 to about 15 hours.

As polymerization initiators that can be used for the emulsion polymerization, inorganic or organic peroxide may be mentioned, and for example, water soluble initiators including potassium persulfate, sodium persulfate, ammonium persulfate, and the like, and oil soluble initiators including cumene hydroperoxide, benzoyl peroxide, and the like may be used.

And, an activator for promoting the initiation of the reaction of peroxide may be further included together with the polymerization initiator, and as the activators, one or more selected from the group consisting of iron formaldehyde sulfoxylate, sodium formaldehyde sulfoxylate, sodium ethylenediamine tetraacetate, ferrous sulfate and dextrose may be used.

However, in the preparation method of the present disclosure, it is preferable to necessarily use a molecular weight control agent such as dodecyl mercaptane, mercaptanes, and the like.

As the emulsifier used in emulsion polymerization, one or more emulsifiers selected from the group consisting of anionic emulsifiers, cationic emulsifiers, and non-ionic emulsifiers may be mentioned.

The emulsifier is material simultaneously having a hydrophilic group and a hydrophobic group, and during the emulsion polymerization process, it forms a micelle structure and enables polymerization of monomers inside the micelle structure.

The emulsifiers commonly used for emulsion polymerization may be classified into anionic emulsifiers, cationic emulsifiers and non-ionic emulsifiers, and for polymerization stability in the emulsion polymerization, two or more kinds may be used in combination.

Specifically, as the anionic emulsifiers, sodium dodecy diphenyl ether disulfonate, sodium polyoxyethylene alkyl ether sulfate, sodium lauryl sulfate, sodium dodecyl benzene sulfonate, dioctyl sodium sulfosuccinate, and the like may be mentioned.

And, the non-ionic emulsifiers may be polyethylene oxide alkyl aryl ether, polyethylene oxide alkyl amine, polyethylene oxide alkyl ester, and the like, they may be used alone or in combinations of two or more kinds, and using anionic emulsifier and non-ionic emulsifier in combination may be more effective, but the kind of emulsifiers is not limited thereto.

The emulsifier may be used in the amount of about 0.01 to about 10 parts by weight, about 1 to about 10 parts by weight, or about 3 to about 5 parts by weight, based on 100 parts by weight of the total monomer components used for the preparation of latex particles.

If the emulsifier is used in an excessive amount, the particle diameter of latex particles may decrease, and thus, the adhesive strength of binder may be lowered, and if it is used too small, polymerization stability in the emulsion polymerization reaction may be lowered, and the stability of produced latex particles may be also lowered.

And, in the emulsion polymerization for the preparation of the styrene-butadiene based elastomer rubber (B), it is preferable that the polymerization reaction is not completed, is terminated at a polymerization degree of about 40 to about 90%, or about 50 to about 70%, and the remaining monomers are removed by stripping.

By such a method, styrene-butadiene based elastomer rubber including lots of non-crosslinked polymers, and having a gel content greater than about 0 wt % and less than about 20% may be prepared.

And, the aliphatic conjugated diene based latex particles (A1) having a gel content calculated by the following Mathematical Formula 1 of 90 wt % or more, acrylic acid ester based latex particles (A2) and styrene-butadiene based elastomer rubber (SBR)(B) having a gel content calculated by the following Mathematical Formula 2 less than 20 wt % may respectively exist in a separate phase in the binder composition.

Wherein, the description "each particle exist in a separate phase" means that between the aliphatic conjugated diene based latex particles (A1), acrylic acid ester based latex particles (A2) and styrene-butadiene based elastomer rubber (SBR)(B), agglomeration between each particle is not generated, and a shape as a separate particle is maintained.

Namely, in the binder composition for a rechargeable battery of the present disclosure, the aliphatic conjugated diene based latex particles (A1), acrylic acid ester based latex particles (A2) and styrene-butadiene based elastomer rubber (B) respectively exist in a separate phase in the binder composition, thus contributing to improvement in electrode adhesion and battery performances.

According to one embodiment, the binder composition for a rechargeable battery may comprise, based on 100 parts by weight of the latex particles (A), 1 to 40 parts by weight of the styrene-butadiene based elastomer rubber (SBR)(B), and preferably, the lower limit is about 1 part by weight or more, or about 5 parts by weight or more, and the upper limit is about 40 parts by weight or less, or about 30 parts by weight or less.

If the content of the styrene-butadiene based elastomer rubber is too low, electrode adhesion may be deteriorated, and thus, electrode delamination may be generated, and if the content of the styrene-butadiene based elastomer rubber is too high, latex particles and rubber particles may be agglomerated, and thus, mechanical stability may be deteriorated, and electrode resistance may increase.

Solvent

According to one embodiment, the electrode binder composition for a rechargeable battery may further comprise an aqueous solvent, besides the above explained emulsion polymer particles, namely latex particles.

Wherein, the aqueous solvent may be used in an amount of about 50 to about 1,000 parts by weight, preferably about 100 to about 300 parts by weight, based on 100 parts by weight of the latex particles, so as to control the stability and viscosity of latex particles, and for example, based on the total amount of the binder composition, it may be used such that total solid content (TSC) may become about 5 to about 70 wt %.

If the solvent is used too small, the stability of latex particles may be lowered, and if it is used excessively, viscosity may be lowered, and the adhesive strength of the binder may decrease, and thus, the performances of a battery may be deteriorated.

Electrode Mixture and Electrode

Meanwhile, according to another aspect of the present disclosure, there is provided a rechargeable battery electrode mixture comprising the above explained electrode binder composition for a rechargeable battery and electrode active material.

And, according to another aspect of the present disclosure, there is provided a rechargeable battery electrode comprising an electrode mixture layer comprising the rechargeable battery electrode mixture; and an electrode current collector.

Except the above explained binder, electrode active material, electrode current collector, and the like used in the electrode mixture and electrode of the present disclosure may respectively comprise commonly known constructional elements.

For example, the electrode mixture may be used for the preparation of an anode. Namely, the electrode mixture may be an anode mixture, and the electrode active material may be anode active material.

Wherein, the binder may be included in the content of 1 wt % to 10 wt %, specifically 1 wt % to 5 wt %, based on the total weight (100 wt %) of the anode mixture. Within this range, the content of the anode active material may be relatively increased, and discharge capacity of the electrode may be further improved.

Meanwhile, since the binder has excellent binding strength, mechanical properties, and the like, not only in case graphite anode active material is used as the anode active material of the anode mixture, but also in case anode active material with higher capacity is used, binding strength between anode active material and anode active material, between anode active material and anode current collector, and the like, may be maintained, and the expansion of anode active material may be inhibited by its mechanical properties.

As explained, since the binder is suitable for apply together with graphite anode active material and anode active material with higher capacity, in one embodiment of the present disclosure, the kind of the anode active material is not specifically limited.

Specifically, as the anode active material, carbonaceous and graphite materials, such as natural graphite, artificial graphite, carbon fiber, non-graphitizable carbon, and the like; metals that can be alloyed with lithium, such as Al, Si, Sn, Ag, Bi, Mg, Zn, In, Ge, Pb, Pd, Pt, Ti, and the like, and compounds including such elements; composites of metal or compounds thereof with carbonaceous and graphite material; lithium-containing nitride; titanium oxide; lithium titanium oxide, and the like may be mentioned, but the anode active material is not limited thereto. Among them, carbonaceous active material, silicon-based active material, tin-based active material, or silicon-carbon active material is more preferable, and these may be used alone or in combinations.

The anode current collector is generally formed with a thickness of 3 to 500 μm. The anode current collector is not specifically limited as long as it is conductive without inducing chemical changes in the corresponding battery, and for example, copper, stainless steel, aluminum, nickel, titanium, baked carbon, copper or stainless steel surface treated with carbon, nickel, titanium, silver, and the like, aluminum-cadmium alloy, and the like may be used. And, similarly to a cathode current collector, fine unevenness may be formed on the surface to reinforce the binding strength of the anode active material, and it may be used in various forms such as a film, a sheet, a foil, a net, a porous body, a foaming body, non-woven fabrics, and the like.

The anode may be prepared by coating an electrode mixture comprising anode active material and the binder on an anode current collector, and then, drying and rolling, and if necessary, a conductive agent, filler, and the like may be further added.

The conductive agent is not specifically limited as long as it has conductivity without inducing chemical change in the corresponding battery, and for example, graphite such as natural graphite or artificial graphite, and the like; carbon black such as carbon black, acetylene black, ketjen black, channel black, furnace black, lamp black, summer black, and the like; conductive fiber such as carbon fiber or metal fiber, and the like; metal powder such as fluorinated carbon, aluminum nickel powder, and the like; conductive whisker such as zinc oxide, potassium titanate, and the like; conductive oxide such as titanium oxide, and the like; conductive materials such as polyphenylene derivatives, and the like may be used.

The filler is optionally used as a component for inhibiting the expansion of an anode, is not specifically limited as long as it is fibrous material without inducing chemical changes in corresponding battery, and for example, olefin polymer such as polyethylene, polypropylene; fibrous material such as glass fiber, carbon fiber, and the like may be used.

Meanwhile, the electrode mixture is not limited to an anode mixture, and it may be used for the preparation of a cathode. Namely, the electrode mixture may be a cathode mixture, and the electrode active material may be cathode active material.

As the cathode active material, layered compounds such as lithium cobalt oxide ($LiCoO_2$), lithium nickel oxide ($LiNiO_2$), unsubstituted or substituted with one or more transition metals; lithium manganese oxide such as $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$, and the like; lithium iron phosphate represented by $Li_{1+a}Fe_{1-x}M_xPO_{4-b}A_b$ (wherein, M is one or more selected from the group consisting of Mn, Ni, Co, Cu, Sc, Ti, Cr, V and Zn, A is one or more selected from the group consisting of S, Se, F, Cl and I, $-0.5<a<0.5$, $0\leq x\leq 0.5$, $0\leq b\leq 0.1$); Ni-site lithium nickel oxide represented $LiNi_{1-x}M_xO_2$ (wherein, M=Co, Mn, Al, Cu, Fe, Mg, B or Ga, x=0.01 to 0.3); $LiMn_{2-x}M_xO_2$ (wherein, M=Co, Ni, Fe, Cr, Zn or Ta, x=0.01 to 0.1), lithium manganese complex oxide represented by $Li_2Mn_3MO_8$ (wherein, M=Fe, Co, Ni, Cu or Zn) or lithium manganese complex oxide of a spinel structure represented by $LiNi_xMn_{2-x}O_4$; lithium-nickel-manganese-cobalt oxide represented by $Li(Ni_pCo_qMn_{r1})O2$ (wherein, $0<p<1$, $0<q<1$, $0<r1<1$, $p+q+r1=1$), or lithium-nickel-manganese-cobalt oxide represented by $Li(Ni_{p1}Co_{q1}Mn_{r2})O_4$ (wherein, $0<p1<2$, $0<q1<2$, $0<r2<2$, $p1+q1+r2=2$), or lithium-nickel-cobalt-transition metal (M) oxide represented by $Li(Ni_{p2}Co_{q2}Mn_{r3}M_{s2})O2$ (wherein, M is selected from the group consisting of Al, Fe, V, Cr, Ti, Ta, Mg and Mo, each of p2, q2, r3 and s2 is the atomic fraction of independent element, $0<p2<1$, $0<q2<1$, $0<r3<1$, $0<s2<1$, $p2+q2+r3+s2=1$), and the like may be mentioned, but the cathode active material is not limited thereto.

The cathode current collector is generally formed to a thickness of 3 μm to 500 μm. Such a cathode current collector is not specifically limited as long as it has high conductivity without inducing chemical change in corresponding battery, and for example, stainless steel, aluminum, nickel, titanium, baked carbon, or aluminum or stainless steel of which surface is treated with carbon, nickel, titanium, silver, and the like, may be used. On the surface of the cathode current collector, fine unevenness may be formed to increase adhesion with cathode active material, and it may be used in various shapes such as a film, a sheet, a foil, a net, a porous body, a foam body, a non-woven body, and the like.

Among the anode and cathode, in the electrodes where the above explained binder is not used, commonly known binders may be used. As representative examples, polyvinylalcohol, carboxylmethyl cellulose, hydroxypropyl cellulose, polyvinyl chloride, carboxylated polyvinyl chloride, polyvinyl fluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used, but the binder is not limited thereto.

The anode and cathode may be respectively prepared by mixing each active material and binder, if necessary, a conductive agent, filler, and the like in a solvent to prepare electrode mixture slurry, and coating the electrode mixture on each electrode current collector. Since such an electrode preparation method is well known in the art, detailed explanation thereof will be omitted.

Battery

Meanwhile, according to another aspect of the invention, there is provided a rechargeable battery comprising the rechargeable battery electrode. The battery may comprise a cathode; electrolyte; and an anode.

The rechargeable battery may be realized as a lithium rechargeable battery.

The lithium rechargeable battery may be prepared by impregnating an electrode assembly comprising a cathode, a separator and an anode with non-aqueous electrolyte.

The cathode and anode are as explained above.

The separator separates an anode and a cathode and provides pathway for lithium ion movement, and those commonly used in lithium batteries may be used. Namely, those having low resistance to electrolyte ion movement and having excellent electrolyte wetting capability may be used. For example, it may be selected from glass fiber, polyester, Teflon, polyethylene, polypropylene, polytetrafluoroethylene (PTFE) or combinations thereof, and it may be in the form of non-woven fabrics or woven fabrics. For example, polyolefin polymer separators such as polyethylene, polypropylene, and the like are mainly used for lithium ion batteries, and coated separators including ceramic components or polymer material may be used to secure heat resistance or mechanical strength, and it may be selectively used in a monolayer or multilayer structure.

According to circumstances, gel polymer electrolyte may be coated on the separator so as to increase battery stability. Representative examples of the gel polymer, polyethylene oxide, polyvinylidene fluoride, polyacrylonitrile, and the like may be mentioned.

However, in case solid electrolyte is used instead of the non-aqueous electrolyte, the solid electrolyte may also serve as a separator.

The non-aqueous electrolyte may be liquid electrolyte comprising a non-aqueous organic solvent and lithium salts. The non-aqueous organic solvent functions as a medium where ions involved in the electrochemical reactions of batteries can move.

As the non-aqueous electrolyte, non-aqueous liquid electrolyte, organic solid electrolyte, inorganic solid electrolyte, and the like may be used.

As the non-aqueous liquid electrolyte, aprotic organic solvents such as N-methyl-2-pyrrolidinone, propylene carbonate, ethylene carbonate, butylenes carbonate, dimethyl carbonate, diethyl carbonate, ethylmethyl carbonate, gamma-butyrolactone, 1,2-dimethoxy ethane, 1,2-diethoxy ethane, tetrahydroxyfuran (franc), 2-methyl tetrahydrofurane, dimethylsulfoxide, 1,3-dioxolane, 4-methyl-1,3-dioxene, diethylether, formamide, dimethylformamide, dioxolane, acetonitrile, nitromethane, formic acid methyl ester, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofurane derivatives, ether, methyl propionate, ethyl propionate, and the like may be used.

As the organic solid electrolyte, polyethylene derivatives, polyethylene oxide derivatives, polypropylene oxide derivatives, phosphoric acid ester polymer, poly agitation lysine, polyester sulfide, polyvinyl alcohol, polyvinylidine fluoride, polymer containing ionic dissociable groups, and the like may be used.

As the inorganic solid electrolyte, nitride, halogenide, sulfate of Li such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $Li_3PO_4-Li_2S-SiS_2$, and the like may be used.

The lithium salt is material soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroboroane lithium, lower aliphatic carbonic acid lithium, 4 phenyl lithium borate, and the like may be used.

And, in order to improve flame retardancy, and the like, to the electrolyte, pyridine, triethyl phosphate, triethanolamine, cyclic ether, ethylene diamine, n-glyme, hexaphosphoric acid triamide, nitrobenzene derivatives, sulfur, quinone imine dye, N-substituted oxazolidinone, N,N-substituted imidazolidine, ethyleneglycol dialkylether, ammonium salt, pyrrole, 2-methoxy ethanol, aluminum trichloride, and the like may be added. According to circumstances, in order to invest incombustibility, halogen containing solvents such as carbon tetrachloride, trifluoroethylene, and the like may be further included, and in order to improve high temperature preservability, carbon dioxide gas may be further included, and FEC (fluoro-ethylene carbonate), PRS (propene sultone), FPC (fluoro-propylene carbonate), and the like may be further included.

The lithium rechargeable battery according to the present disclosure may be not only used in a battery cell used as power supply of a small device, but also used as a unit battery in a medium-large sized battery module comprising plural battery cells.

Advantageous Effects

The binder composition for a rechargeable battery of the present disclosure not only has excellent properties in terms of binding strength, mechanical properties, and the like, but also can maintain structural stability of the electrode even after repeated charge/discharge cycles, thus improving the performance of rechargeable batteries.

DETAILED DESCRIPTION OF THE EMBODIMENTS

Hereinafter, through specific examples of the invention, the actions and effects of the invention will be explained in more detail. However, these examples are presented only as the illustrations of the invention, and the scope of the right of the invention is not determined thereby.

EXAMPLE

Preparation of Aliphatic Conjugated Diene Based Latex Particles (A1)

As monomers, 40.5 g of 1,3-butadiene, 48.5 g of styrene, 5.5 g of methyl methacrylate, and 5.5 g of a mixture comprising acrylic acid and itaconic acid at a ratio of 5:5 were used.

As a solvent, based on 100 parts by weight of the total monomer components, about 100 parts by weight of water were used.

Into a nitrogen-replaced polymerization reactor, water, the above described monomers, and as an emulsifier, based on 100 parts by weight of the total monomer components, about 3 parts by weight of sodium lauryl sulfate, were introduced, and the temperature was raised to about 75° C., and then, as a polymerization initiator, 0.01 moles of potassium persulfate were introduced to initiate emulsion polymerization.

While maintaining the temperature at about 75° C., the reaction was progressed for about 7 hours, thus obtaining a binder in the form of an emulsion, and the pH was adjusted to 7 using sodium hydroxide.

The gel content of the prepared aliphatic conjugated diene based latex particles (A1) was about 97.3%.

The gel content was measured as follows.

First, about 0.5 g of the above prepared aliphatic conjugated diene based latex particles (A1) were taken, and dried at 80° C. for 24 hours, and then, the exact weight was measured (Ma).

And, about 50 g of the aliphatic conjugated diene based latex particles (A1), of which weight had been measured, were immersed in about 50 g of tetrahydrofurane (THF) at room temperature for 24 hours, sieved using a 200 mesh sieve, and dried at 80° C. for 24 hours, and then, the exact weight was measured (Mb).

The gel content was calculated by the following Mathematical Formula 1.

$$\text{Gel content (wt \%)} = 100 * Mb1/Ma1 \quad \text{[Mathematical Formula 1]}$$

Meanwhile, due to high gel content of the aliphatic conjugated diene based latex particles (A1), weight average molecular weight could not be measured.

Preparation of Styrene-Butadiene Based Elastomer Rubber (SBR)(B)

As monomers, 54.5 g of 1,3-butadiene, 40.5 g of styrene, 3 g of hydroxypropyl methacrylate, and 2 g of a mixture comprising acrylic acid and itaconic acid at a ratio of 5:5 were used.

Into a nitrogen replaced polymerization reactor, water, the above described monomers, and as emulsifier components, based on 100 parts by weight of the monomer components, about 5 parts by weight oleic acid ester salt and sodium lauryl sulfate were introduced, and while maintaining the temperature at about 10° C., based on 100 parts by weight of the monomer components, 0.5 parts by weight of cumene hydroperoxide as a polymerization initiator, and 0.5 parts by weight of dodecyl mercaptane as a molecular weight control agent were batch-introduced to initiate emulsion polymerization.

While maintaining the temperature at about 10° C., when the polymer conversion rate became about 60%, the reaction was terminated to obtain styrene-butadiene based elastomer rubber (SBR) (B).

The glass transition temperature of the styrene-butadiene based elastomer rubber, measured by Differential Scanning calorimetry (DSC), was about −28° C.

(DSC, device name: DSC 2920, manufacturing company: TA instrument)

And, Mooney viscosity of the styrene-butadiene based elastomer rubber was about 80. The Mooney viscosity was measured using MV-2000(ALPHA Technologies) at 100° C., at Rotor Speed 2±0.02 rpm, using Large Rotor, wherein the sample used was left at room temperature (23±3° C.) for 30 minutes or more, and then, 27±3 g of the sample was taken and filled in a die cavity, and Platen was operated to measure the viscosity for 4 minutes.

The gel content of the prepared styrene-butadiene based elastomer rubber was about 10%.

The gel content was measured as follows.

First, about 0.5 g of the above prepared styrene-butadiene based elastomer rubber (B) were taken, and dried at 80° C. for 24 hours, and then, the exact weight was measured (Ma).

And, about 50 g of the styrene-butadiene based elastomer rubber (B), of which weight had been measured, were immersed in about 50 g of tetrahydrofurane (THF) at room temperature for 24 hours, sieved using a 200 mesh sieve, and dried at 80° C. for 24 hours, and then, the exact weight was measured (Mb).

The gel content was calculated by the following Mathematical Formula 2.

$$\text{Gel content (wt \%)} = 100 * Mb2/Ma2 \quad \text{[Mathematical Formula 2]}$$

Meanwhile, the weight average molecular weight of the prepared styrene-butadiene based elastomer rubber was about 700,000.

The weight average molecular weight was measured as follows.

Device: gel permeation chromatography GPC (Measuring device name: Alliance e2695; Manufacturing company: WATERS); Detector: differential refractive index detector (Measuring device name: W2414; Manufacturing company: WATERS); Column: DMF column; flow rate: 1 mL/minute; column temperature: 65° C.; introduction amount: 0.100 mL; sample for standardization: polystyrene

Example 1

The aliphatic conjugated diene based latex particles (A1) and styrene-butadiene based elastomer rubber (SBR) (B) were mixed at a ratio of 95:5 to prepare a binder composition.

Example 2

The aliphatic conjugated diene based latex particles (A1) and styrene-butadiene based elastomer rubber (SBR) (B) were mixed at a ratio of 90:10 to prepare a binder composition.

Reference Examples 3 to 5

The aliphatic conjugated diene based latex particles (A1) and styrene-butadiene based elastomer rubber (SBR) (B) were mixed at a ratio of 7:3 to 3:7 to prepare binder compositions.

Comparative Example 1

A binder composition was prepared using the aliphatic conjugated diene based latex particles (A1) only.

Comparative Example 2

A binder composition was prepared using the styrene-butadiene based elastomer rubber (SBR) (B) only.

Preparation of an Anode Mixture

On the basis of 100 g of total solid content, 96.2 g of artificial graphite, 0.5 g of acetylene black, 1.8 g of the above prepared binder, and 1.5 g of carboxy methyl cellulose as a thickener were mixed using water as a dispersion medium, and anode slurry was prepared such that total solid content became 50 wt %.

Preparation of Anode

Using a comma coater, the above anode mixture was coated on a copper foil to a thickness of about 140 μm, dried in a dry oven of 90° C. for 15 minutes, and then, roll-pressed to the final thickness of 90 μm, thus obtaining an anode.

Latex Stability Test

In order to confirm the mechanical stabilities of the binders prepared in Examples, Reference Examples, and Comparative Examples, using a homogenizer, 150 g of each binder was put in a container, and a head was fixed so as to be immersed in the binder, and then, shear was applied at 3000 rpm for about 10 minutes, and the binder was sieved through about 20 mesh sieve to measure coagulum.

Electrode Adhesion Test

In order to measure adhesion between an electrode mixture and a current collector, the surface of each electrode prepared in Examples, Reference Examples and Comparative Examples was cut and fixed on a slide glass, and then, while peeling the current collector, 180 degree peel strength was measured.

It was measured 5 or more times per electrode, and the mean value was calculated.

Electrode Resistance Test

For each electrode prepared in Examples, Reference Examples, and Comparative Examples, resistance value of the coating layer was measured through Multi Probe Test.

Measurement of Electrode Delamination

For each electrode prepared in Examples, Reference Examples, and Comparative Examples, 50 samples were prepared using a press (50 mm*50 mm), and laminated, and then, materials produced due to delamination on the side were recovered with a tape, and the weight was measured.

The measurement results were summarized in the following Table.

TABLE 1

| | Mixing ratio | | Coagulum | Adhesion | resistance | Delamination amount |
|---|---|---|---|---|---|---|
| | (A) | (B) | ppm | gf/10 mm | mΩ cm | mg |
| Example 1 | 95 | 5 | 120 | 11.2 | 27.1 | 121 |
| Example 2 | 90 | 10 | 670 | 12.9 | 27.9 | 44 |
| Reference Example 3 | 70 | 30 | 3650 | 13.5 | 31.6 | 38 |
| Reference Example 4 | 50 | 50 | 5120 | 13.3 | 35.7 | 41 |
| Reference Example 5 | 30 | 70 | 6490 | 13.8 | 39.5 | 49 |
| Comparative Example 1 | 100 | 0 | 50 | 9.4 | 26.5 | 288 |
| Comparative Example 2 | 0 | 100 | 7380 | 14.2 | 43.1 | 39 |

Referring to the Table, it can be confirmed that in the case of Comparative Example 1 which was prepared using only a butadiene-based binder, previously commonly used as an electrode binder, adhesion was not good, and electrode delamination amount was large, while the binder compositions according to Examples of the present disclosure not only have excellent latex stability and very excellent adhesion, but also are excellent in terms of coagulum, resistance, and delamination amount.

Thus, the electrode binder composition according to one embodiment of the present disclosure not only has excellent properties in terms of binding strength, mechanical properties, and the like, but also can maintain structural stability of an electrode even after repeated charge discharge cycles, and thus, it is expected to significantly improve rechargeable battery performances.

What is claimed is:

1. An electrode binder composition for a rechargeable battery comprising (A) one or more latex particles including at least one of aliphatic conjugated diene based latex particles (A1) having a gel content calculated by the following Mathematical Formula 1 of 90 wt % or more, or acrylic acid ester based latex particles (A2); and (B) styrene-butadiene based elastomer rubber (SBR) having a gel content calculated by the following Mathematical Formula 2 of less than 20 wt %:

$$\text{Gel content (wt \%)}=100*Mb1/Ma1 \quad \text{[Mathematical Formula 1]}$$

in the Mathematical Formula 1, Ma1 is a weight of the aliphatic conjugated diene based latex particles (A1), measured after drying at 80° C. for 24 hours;

Mb1 is a weight measured after immersing the aliphatic conjugated diene based latex particles (A1) of which the weight has been measured, in tetrahydrofurane (THF) at room temperature for 24 hours, and sieving with a 200 mesh sieve, and then, drying at 80° C. for 24 hours, $$\text{Gel content (wt \%)}=100*Mb2/Ma2 \quad \text{[Mathematical Formula 2]}$$

in the Mathematical Formula 2 Ma2 is a weight of the styrene-butadiene based elastomer rubber (SBR) (B), after drying at 80° C. for 24 hours; and Mb2 is a weight measured after immersing the styrene-butadiene based elastomer rubber (SBR) (B) of which weight has been measured, in tetrahydrofurane (THF) at room temperature for 24 hours, and sieving with a 200 mesh sieve, and then, drying at 80° C. for 24 hours.

2. The electrode binder composition for a rechargeable battery according to claim 1, wherein the aliphatic conjugated diene based latex particles (A1) comprise repeat units derived from aliphatic conjugated diene based monomers; and repeat units derived from one or more monomers selected from the group consisting of aromatic vinyl based monomers, alkyl (meth)acrylic acid ester based monomers, (meth)acryl amide based monomers, alkenyl cyanide monomers, and unsaturated carboxylic acid based monomers.

3. The electrode binder composition for a rechargeable battery according to claim 1, wherein the aliphatic conjugated diene based latex particles (A1) comprise 30 to 60 wt % of repeat units derived from aliphatic conjugated diene based monomers;

35 to 60 wt % of repeat units derived from aromatic vinyl based monomers;

1 to 10 wt % of repeat units derived from alkyl (meth) acrylic acid ester based monomers; and 1 to 10 wt % of repeat units derived from unsaturated carboxylic acid based monomers.

4. The electrode binder composition for a rechargeable battery according to claim 1, wherein the acrylic acid ester based latex particles (A2) comprise repeat units derived from alkyl (meth)acrylic acid ester based monomers;

repeat units derived from one or more monomers selected from the group consisting of aromatic vinyl based monomers, (meth)acryl amide based monomers, and alkenyl cyanide monomers, and repeat units derived from unsaturated carboxylic acid based monomers.

5. The electrode binder composition for a rechargeable battery according to claim 1, wherein the acrylic acid ester based latex particles (A2) comprise 50 to 95 wt % of repeat units derived from alkyl (meth) acrylic acid ester based monomers;

1 to 40 wt % of repeat units derived from one or more monomers selected from the group consisting of aromatic vinyl based monomers, (meth)acryl amide based monomers, and alkenyl cyanide monomers, and 1 to 20 wt % of repeat units derived from unsaturated carboxylic acid based monomers.

6. The electrode binder composition for a rechargeable battery according to claim 1, wherein the styrene-butadiene based elastomer rubber (SBR) (B) comprises repeat units derived from styrene based monomers, repeat units derived from conjugated diene based monomers, repeat units derived from hydroxyalkyl (meth)acrylate monomers, and repeat units derived from unsaturated carboxylic acid based monomers.

7. The electrode binder composition for a rechargeable battery according to claim 1, wherein the styrene-butadiene based elastomer rubber (SBR) (B) comprises 30 to 60 wt % of repeat units derived from styrene based monomers;

35 to 65 wt % of repeat units derived from conjugated diene based monomers;

1 to 10 wt % of repeat units derived from hydroxyalkyl (meth)acrylate monomers; and 1 to 10 wt % of repeat units derived from unsaturated carboxylic acid based monomers.

8. The electrode binder composition for a rechargeable battery according to claim 1, wherein the styrene-butadiene based elastomer rubber (SBR) (B) has a Moony viscosity (MV) at 100° C. of 30 to 170.

9. The electrode binder composition for a rechargeable battery according to claim 1, wherein the styrene-butadiene based elastomer rubber (SBR) (B) has a glass transition temperature measured by differential scanning calorimetry, of −5 to −40° C.

10. The electrode binder composition for a rechargeable battery according to claim 1, wherein the composition comprises 1 to 40 parts by weight of the styrene-butadiene based elastomer rubber (SBR) (B), based on 100 parts by weight of the latex particles (A).

11. A rechargeable battery electrode mixture comprising the binder composition for a rechargeable battery according claim 1, and electrode active material.

12. The rechargeable battery electrode mixture according to claim 11, further comprising a conductive agent.

13. A rechargeable battery electrode comprising an electrode mixture layer comprising the rechargeable battery electrode mixture of claim 11; and an electrode current collector.

14. A rechargeable battery comprising the rechargeable battery electrode of claim 13 and an electrolyte.

* * * * *